US008010010B2

(12) United States Patent
Kishi

(10) Patent No.: US 8,010,010 B2
(45) Date of Patent: Aug. 30, 2011

(54) ENERGY STORAGE DEVICE, IMAGE FORMING APPARATUS INCLUDING ENERGY STORAGE DEVICE, AND DISCHARGE CONTROL METHOD

(75) Inventor: Kazuhito Kishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 620 days.

(21) Appl. No.: 12/133,525

(22) Filed: Jun. 5, 2008

(65) Prior Publication Data

US 2008/0304852 A1 Dec. 11, 2008

(30) Foreign Application Priority Data

Jun. 11, 2007 (JP) ................................ 2007-154300

(51) Int. Cl.
*G03G 15/00* (2006.01)
*G03G 15/20* (2006.01)
*G03G 21/00* (2006.01)
*H02M 3/06* (2006.01)
*H02J 3/38* (2006.01)

(52) U.S. Cl. .......... 399/88; 399/328; 399/335; 219/470; 307/44; 307/109

(58) Field of Classification Search .................... 399/88, 399/89, 328, 335, 336; 307/44, 48, 109; 361/235; 219/470
See application file for complete search history.

(56) References Cited

U.S. PATENT DOCUMENTS 6,542,705 B2 * 4/2003 Fujita et al. ..................... 399/69
6,847,792 B2 * 1/2005 Nakafuji et al. ................ 399/69
7,343,113 B2 * 3/2008 Matsusaka et al. ............ 399/69
2006/0051112 A1 * 3/2006 Matsusaka et al. ............ 399/44
2006/0051121 A1 * 3/2006 Matsusaka et al. ............ 399/70

FOREIGN PATENT DOCUMENTS

JP 2000-315567 11/2000
JP 2000315567 A * 11/2000
JP 2002184554 A * 6/2002
JP 2005223984 A * 8/2005
JP 2006-330639 12/2006

* cited by examiner

*Primary Examiner* — David M Gray
*Assistant Examiner* — Fred Braun
(74) *Attorney, Agent, or Firm* — Oblon, Spivak, McClelland, Maier & Neustadt, L.L.P.

(57) ABSTRACT

An energy storage device that includes capacitor cells of a first type having a first internal resistance and capacitor cells of a second type having a second internal resistance which is higher than the first internal resistance. Further, there is a detection unit that detects a voltage value between two opposing ends of at least one of the capacitor cells, or a voltage detection switching unit that integrates a switch arranged between two opposing ends of at least one of the capacitor cells.

9 Claims, 9 Drawing Sheets

ENERGY STORAGE DEVICE, IMAGE FORMING APPARATUS INCLUDING ENERGY STORAGE DEVICE, AND DISCHARGE CONTROL METHOD

BACKGROUND OF THE INVENTION

1. Field of the Invention

The present invention relates to an energy storage device including plural capacitor cells.

2. Description of the Related Art

An image forming apparatus, such as a multifunction printer (MFP), a printer, or a facsimile machine (FAX) is configured to form an image on an image forming medium, such as normal paper or an overhead projector (OHP) sheet, using one of various image forming methods.

Among the various image forming methods that may be used by an image forming apparatus, the electrophotographic method is widely used by current image forming apparatuses owing to its advantages with regard to speed, quality, and costs.

The electrophotographic method includes a process of forming a toner image on an image forming medium and fixing the toner image onto the image forming medium using heat and pressure. It is noted that the heat roller method is widely used for performing such a process owing to its advantages with regard to speed and safety.

The heat roller method involves pressing a pressure roller against a heat roller that is heated by a heat generating member such as a halogen heater to form a so-called nip portion where the rollers are pressed against each other, and passing an image forming medium holding a pre-fixed toner image between the rollers to fix the toner image onto the image forming medium.

The heat roller is a metal roller that is primarily made of metal such as steel or aluminum so that it has a relatively large heat capacity. Thus, the heat roller has a drawback in that it requires a relatively long time of around a few minutes to ten plus a few minutes to be heated to a usage temperature of approximately 180° C. at which the heat roller may be used.

Accordingly, in a typical image forming apparatus, even during standby mode when an image forming process such as printing is not performed by a user, electrical power is supplied to the heat roller to maintain the temperature of the heat roller at a preheated temperature that is slightly lower than the usage temperature of the heat roller. In this way, for example, when a print execution request is issued by a user, the heat roller may be heated to the usage temperature in a relatively short period of time so that printing may be performed without a long waiting time from the time the print execution request is issued to the time printing operations are started.

However, because the heat roller is maintained at a preheated temperature slightly lower than the usage temperature, even when the image forming apparatus is not used (i.e., in standby mode), excessive power that is not directly necessary for image formation is consumed by the image forming apparatus.

In view of the growing awareness of issues related to environmental protection, specifications and guidelines related to energy conservation of office automation (OA) equipment are being established as is exemplified by the Energy Star program, which is being promoted by the Japanese Ministry of Economy, Trade and Industry and the U.S. Environmental Protection Agency (EPA).

Considering such a background, current image forming apparatuses are desirably configured to conform to such energy conservation specifications and guidelines. It is noted that reducing the above-described excessive power consumption that is not directly necessary for image formation is one effective way of satisfying the requirements of such specifications and guidelines. To reduce such excessive power consumption, power supply to a fixing device of an image forming apparatus during standby mode is desirably set to zero.

However, when the power supplied to the fixing device is set to zero in a conventional image forming apparatus, a relatively long time is required for the heat roller to reach its corresponding usage temperature upon being restarted so that the waiting time from the time a print execution request is issued to the time printing operations are started may be relatively long. Such an effect can cause stress on the user. Accordingly, an image forming apparatus conforming to a given energy conservation program is generally required to implement measures for enabling its heat roller to be quickly heated to its corresponding usage temperature upon being restarted. For example, the Zero Energy Star Mode (ZESM) requires its qualified energy-conserving image forming apparatus to be able to restart operations from standby mode within ten seconds.

It is noted that increasing the input energy per time unit, namely the rated apparent power, of the image forming apparatus is one way of reducing the time required for heating the heat roller to its corresponding usage temperature. For example, there are image forming apparatuses with high speed printing capabilities that are adapted to use a power supply of 200 V.

However, the power supply in a conventional office environment is typically 100 V/15 A so that the maximum electrical power of the power supply is 1500 W. In order to adapt an office environment to provide a power supply of 200 V, special engineering has to be performed on the present power supply environment which cannot be considered a very practical solution. In another example, an image forming apparatus has been developed that uses two lines of the power supply of 100 V/15 A in order to increase the total input power. However, the image forming apparatus having such a configuration may only be used under an environment where two lines of power outlets are located close to each other.

Thus, more practical measures are in demand for increasing the maximum input energy (power supply) of an image forming apparatus to raise the temperature of the heat roller to its corresponding usage temperature in a short period of time.

In view of such a demand, a method for enabling energy conservation by increasing the maximum power supply of an image forming apparatus has been proposed that involves using a rechargeable auxiliary power supply.

It is noted that a lead storage battery and a nickel-cadmium storage battery are representative examples of rechargeable auxiliary power supply.

However, such a battery (i.e., secondary battery) is prone to degradation upon being repeatedly recharged and its charge capacity may decrease as a result, and the life of such a battery becomes shorter as the discharge current of the battery is increased. For example, even in the case of using a nickel-cadmium storage battery, which is generally known to last for a relatively long time even when being charged/discharge at a large charge/discharge current, the number of times the nickel-cadmium storage battery may be recharged before breaking down is approximately 500-1000 times so that if the battery is recharged 20 times a day, the life of the battery may reach its end in approximately one month. Thus, using such a battery may not be a practical solution owing the burden of having to frequently exchange the battery and high running costs from using many batteries, for example. Further, it is noted that several hours may be required for fully charging such a large capacity battery so that it is not suited for use in an application that requires charging/discharging to be performed many times per day, for example.

In view of such a problem, Japanese Patent No. 3588006 (Publication No. 2000-315567) discloses a technique that involves using a large capacity capacitor such as an electric double layer capacitor (simply referred to as 'capacitor' hereinafter) as an auxiliary power supply in place of a secondary battery.

By using an energy storage device made up of a capacitor as an auxiliary power supply, the time required for a fixing device to reach its corresponding usage temperature (i.e., rise time) may be a relatively short time of a few seconds to ten plus a few seconds, and power exceeding the maximum power that may be provided by a commercial power supply may be supplied to the fixing device. Thus, a reliable and durable fixing device with a short rise time may be provided.

However, owing to the general characteristic that a capacitor has a relatively small energy density, an energy storage device that uses a capacitor including that disclosed in the above-mentioned Japanese Patent No. 3588006 may need a large number of capacitors in order to set the maximum power that may be supplied by the energy storage device to an adequately high level in consideration of cases in which a large amount of power has to be supplied such as the case of supplying power to an image forming apparatus. As a result, the volume (size) of the energy storage device may be enlarged, for example.

It is noted that power supply from an energy storage device to an image forming apparatus may vary over time depending on factors such as the operation status of the image forming apparatus.

For example, during a period of about ten seconds corresponding to the rise time for starting the image forming apparatus, close to 2000 W of power may have to be supplied to the image forming apparatus from the energy storage device. On the other hand, when successive printing is performed by the image forming apparatus after the rise time, the power that needs to be supplied from the energy storage device may be reduced to approximately 500 W. Further, the power supply from the energy storage device to the image forming apparatus may also vary during the successive printing operations. Specifically, during the successive printing operations performed right after the rise time, the fixing device may still not be adequately heated so that a power of approximately 500 W may be required. However, after around ten plus a few seconds, the required power may be reduced further to approximately 200 W.

It is noted that the maximum output density P of a capacitor is inversely proportional to the internal resistance R of the capacitor. Accordingly, in a case where a large amount of power has to be extracted from a capacitor such as during the rise time of the image forming apparatus as is described above, the internal resistance of the capacitor is desirably low. That is, in order to extract a large amount of power from an energy storage device, capacitors with low internal resistance are preferably used in the energy storage device.

(Large Capacity Capacitor)

It is noted that the internal resistance of a capacitor correlates with the capacity of the capacitor; namely, a capacitor with a large capacity tends to have low internal resistance whereas a capacitor with a small capacity tends to have high internal resistance.

The following is a list of methods for reducing the internal resistance of a capacitor module having plural capacitors in cell units (referred to as 'capacitor cells' hereinafter) that are serially connected.

(1) Use capacitor cells with capacities that are larger than necessary.

(2) Connect plural small capacity capacitor cells in parallel.

However, in the case of implementing the above-described methods (1) or (2), the size of the energy storage device including the capacitor cells may be enlarged.

(High Output Capacitor Supplying a Large Amount of Power)

It is noted that a high output capacitor supplying a large amount of power has a small normalized internal resistance value (i.e., internal resistance value obtained by normalizing an RC value (time constant), which is the product of the capacitance C and the internal resistance R of the capacitor cell) and is capable of outputting a large amount of power.

However, such a high output capacitor is larger in size compared to a capacitor outputting standard power so that an energy storage device using such a high output capacitor may become larger as well.

As can be appreciated from the above descriptions, in the case where capacitor cells with low internal resistance are used, the size of the energy storage device inevitably becomes large. In this case, even when an apparatus such as an image forming apparatus only requires a large amount of power during one portion of its overall power supply time, an energy storage device of the apparatus still has to be relatively large to supply such large amount of power.

SUMMARY OF THE INVENTION

One aspect of the present invention is directed to providing an energy storage device that uses a combination of capacitor cells with high internal resistance and capacitor cells with low internal resistance so that the energy storage device may be capable of supplying a large amount of power in a short period of time as well as supplying power for a long period of time without requiring its size to be increased. Other aspects of the present invention are directed to providing an image forming apparatus including such an energy storage device and a discharge control method implemented in such an energy storage device.

According to one embodiment of the present invention, an energy storage device is provided that includes:

capacitor cells of a first type having a first internal resistance; and capacitor cells of a second type having a second internal resistance which is higher than the first internal resistance.

In a preferred embodiment, the capacitor cells of the first type are serially connected to form a first capacitor module;

the capacitor cells of the second type are serially connected to form a second capacitor module; and the first capacitor module and the second capacitor module are connected in parallel.

According to another embodiment of the present invention, an image forming apparatus is provided that includes:

a charge device that charges a surface of a photoconductor;

an exposure device that forms a latent image on the charged surface of the photoconductor;

a developing device that forms a toner image by applying toner to the latent image formed on the surface of the photoconductor;

a transfer device that transfers the toner image on an image forming medium;

a fixing device that fixes the transferred toner image on the image forming medium using heat and pressure; and an energy storage device according to an embodiment of the present invention.

According to another embodiment of the present invention, a discharge control method is provided for controlling discharge operations of an energy storage device that includes a first capacity module having capacitor cells of a first type with a first internal resistance that are serially connected and a second capacitor module having capacitor cells of a second type with a second internal resistance that are serially connected, which second internal resistance is higher than the first internal resistance, the discharge control method including the steps of:

turning on/off a first discharge circuit arranged between a load and the first capacitor module or a second discharge circuit arranged between the load and the second capacitor module based on information indicating an operation status of an apparatus in which the energy device is used and controlling discharge operations of the first capacitor module or the second capacitor module.

Other objects, features and advantages of the present invention will become more apparent from the following detailed description when read in conjunction with the accompanying drawings.

DETAILED DESCRIPTION OF THE PREFERRED EMBODIMENTS

In the following, preferred embodiments of the present invention are described with reference to the accompanying drawings.

First Embodiment

Hardware Configuration of Image Forming Apparatus

In the following, a hardware configuration of an image forming apparatus, such as a printer or a multifunction machine, representing an exemplary apparatus that receives power supplied from an energy storage device according to an embodiment of the present invention is described.

Figure 1:
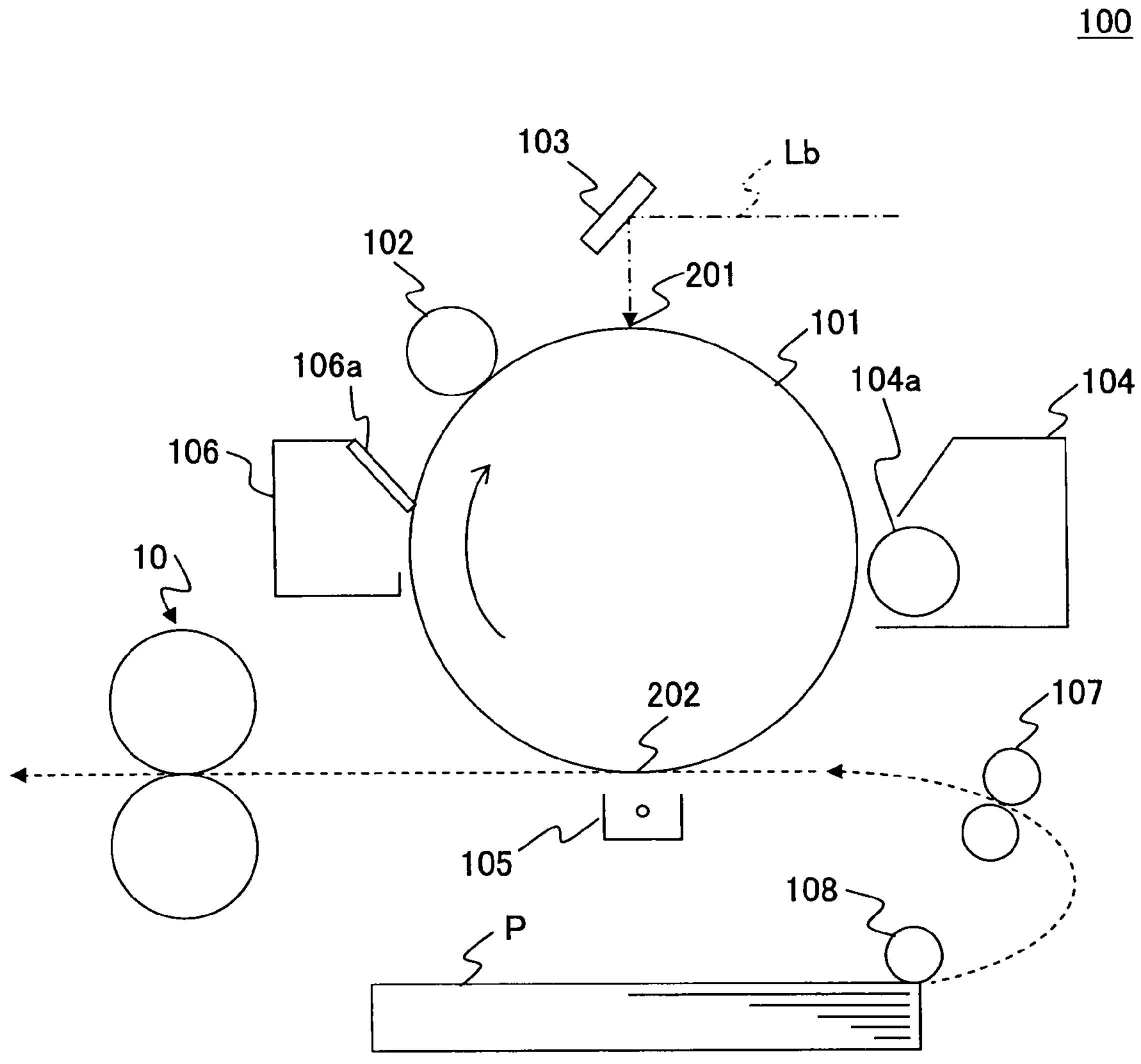
FIG. 1 is a diagram showing a hardware configuration of an image forming apparatus according to an embodiment of the present invention.

FIG. 1 is a diagram showing a hardware configuration of an image forming apparatus 100 including a fixing device according to an embodiment of the present invention.

As is shown in FIG. 1, the image forming apparatus 100 according to the present embodiment includes a drum-shaped photoconductor 101 corresponding to an image carrier that rotates in the direction indicated by arrow 1; a charge device 102 including a charge roller that charges the peripheral face of the photoconductor, a mirror 103 that guides a laser beam (exposure light) Lb to scan the peripheral face of the charged photoconductor 101, which laser beam is irradiated from an exposure device (not shown) that forms a latent image on the peripheral surface of the photoconductor 101; a developing device 104 including a developing roller 104*a* that forms a toner image (image made visible by toner) on the peripheral face of the photoconductor 101 by applying toner to the latent image formed on the peripheral face of the photoconductor 101; a transfer device 105 that transfers the toner image onto an image forming medium P such as transfer paper; and a cleaning device 106 including a blade 106*a* that slides against the peripheral face of the photoconductor 101.

In this drawing, a region on the peripheral face of the photoconductor 101 that is located between the charge device 102 and the developing roller 104*a* corresponding to the irradiating position of the laser beam Lb guided by the mirror 103 is referred to as exposure region 201.

Also, a region between the peripheral face of the photoconductor 101 and the transfer device 105 is referred to as transfer region 202.

Also, the illustrated image forming apparatus 100 has a pair of resist rollers 107 arranged further upstream of the transfer device 105. The image forming medium P that is accommodated in a paper feed tray (not shown) is guided by a conveyor guide (not shown) to be sent out from a paper feed roller 108 toward the resist rollers 107.

Further, the illustrated image forming apparatus 100 has a fixing device 10 arranged further downstream of the transfer device 106 which fixing device is described in detail below with reference to FIG. 2.

(Operations of Image Forming Apparatus)

The image forming apparatus 100 having the hardware configuration as shown in FIG. 1 is configured to print an image on the image forming medium P by performing electrophotographic image forming processes as described below.

(A) Charging and Exposure

The photoconductor 101 starts rotating in the direction indicated by arrow shown in FIG. 1, the peripheral face of the rotating photoconductor 101 is charged by the charge roller of the charge device 102, a laser beam Lb from an exposure device (not shown) is guided by the mirror 103 to be irradiated on the exposure region 201, and the laser beam Lb scans the peripheral face of the charged photoconductor 101 to form a latent image corresponding to an image to be printed.

(B) Developing and Transfer

Through rotation of the photoconductor 101, the latent image formed on the photoconductor 101 is moved to a position opposite the developing device 104 at which toner is applied to the latent image by the developing roller 104*a* of the developer 104 to form a toner image on the peripheral face of the photoconductor 101.

Also, at about the same time, paper feed operations are started by the paper feed roller 108 for conveying the image forming medium P accommodated in a paper feed tray (not shown) toward the resist rollers 107. The image forming medium P is conveyed along a conveying path, which is represented by arrow shown in FIG. 1, and is temporarily stopped at the position of the pair of resist rollers 107 to adjust its feed timing so that the image forming medium P may reach the transfer region 202 at the time the toner image formed on the rotating photoconductor 101 reaches this transfer region 202.

When the appropriate timing comes, the image forming medium P that is stopped at the pair of resist rollers 107 is conveyed through the resist rollers 107 toward the transfer region 202.

Thus, the toner image formed on the peripheral face of the photoconductor 101 and the image forming medium P may meet at the transfer region 202 and the toner image may be transferred onto the image forming medium P by the transfer device 105.

(C) Fixing

The image forming medium P holding the toner image is conveyed toward the fixing device 10. Then, the toner image on the image forming medium P is fixed onto the image forming medium P while it passes through the fixing device 10 after which the image forming medium P is discharged onto a discharge tray (not shown).

(D) Cleaning

It is noted that residual toner that is not transferred to the image forming medium P by the transfer device 105 and remains on the peripheral face of the photoconductor 101 may be moved by the rotation of the photoconductor 101 to reach the location of the blade 106*a* of the cleaning device 106 at which the residual toner may be removed.

The image forming apparatus 100 according to the present embodiment is configured to print an image on an image forming medium P such as normal transfer paper or an OHP sheet by performing the above-described electrophotgraphic image forming processes (A) through (D).

(Hardware Configuration of Fixing Device)

In the following, a hardware configuration of the fixing device 10 of the image forming apparatus 100 according to the present embodiment is described with reference to FIG. 2. It is noted that the fixing device 10 is configured to have a large amount of power supplied thereto from an energy storage device according to an embodiment of the present invention.

Figure 2:
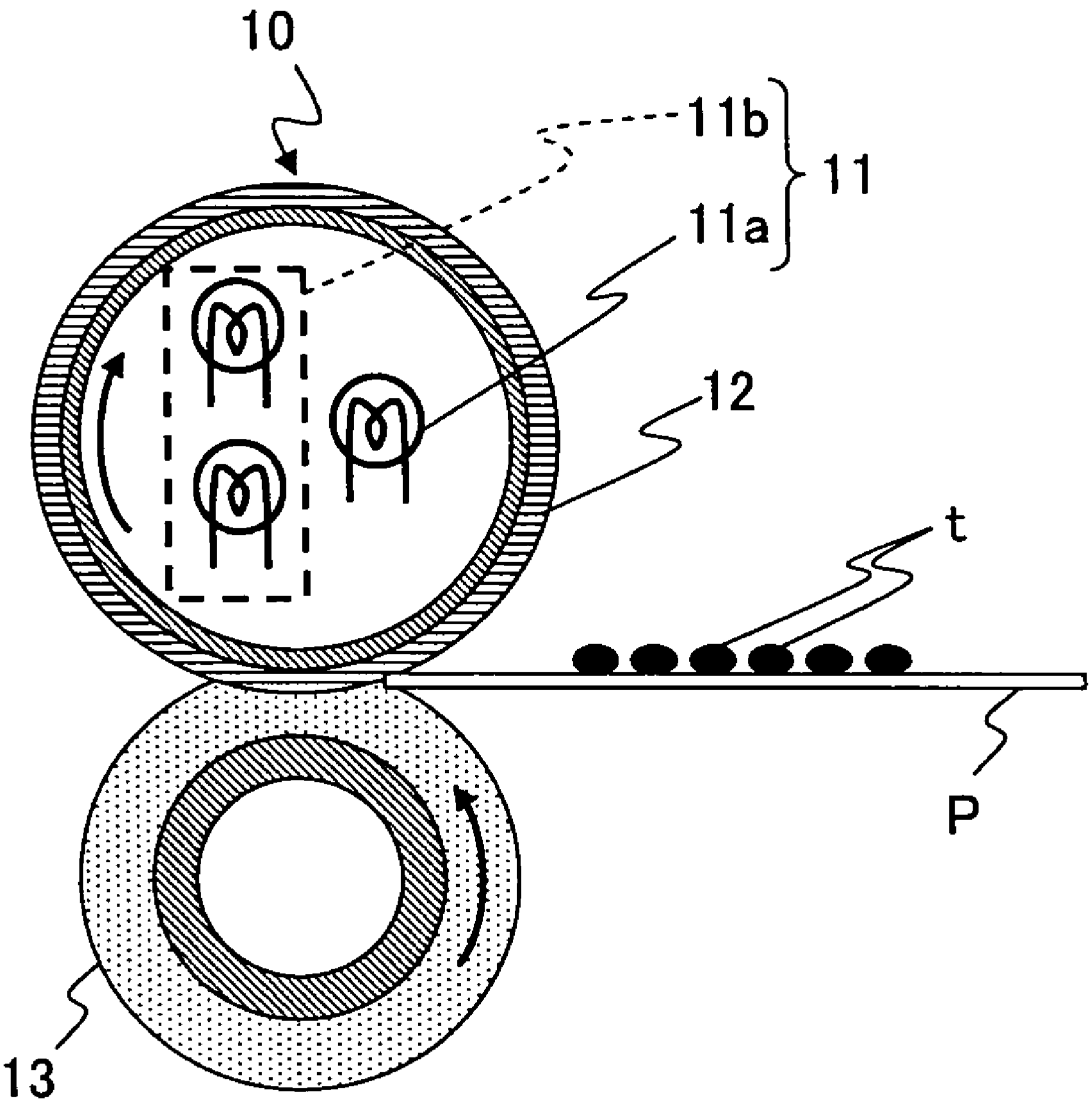
FIG. 2 is a diagram showing a hardware configuration of a fixing device of the image forming apparatus shown in FIG. 1.

FIG. 2 is a diagram showing an exemplary hardware configuration of the fixing device 10 used in the image forming apparatus 100 according to the present embodiment.

According to FIG. 2, the fixing device 10 includes a heat roller (heating member) 12 that applies heat to the image forming medium P holding a toner image t and a pressure roller (pressurizing member) 13 that is arranged to come into contact with the heat roller (heating member) 12 and is configured to apply pressure to the image forming medium P holding the toner image.

The heat roller (heating member) 12 includes a heat generating member 11 that generates heat using power supplied from a power supply. The heat generating member 11 includes a main heat generating element 11*a* and an auxiliary heat generating member 11*b*.

The heat generating member 11 including the main heat generating element 11*a* and the auxiliary heat generating member 11*b* may use halogen heaters as the main heat generating element 11*a* and the auxiliary heat generating member 11*b* to heat the inner side peripheral face of the heat roller 12 with radiant heat, for example.

The heat roller 12 is preferably made of metal such as aluminum or steel so that it may be resistant to deformation upon being having pressure applied thereto, for example. Also, a mold releasing layer is preferably arranged on the outer side peripheral face of the heat roller (heating element) 12 in order to prevent sticking of the toner t of the toner image held on the image forming medium P, and a blackening process is preferably performed on the inner side peripheral face of the heat roller (heating element) 12 in order to enable efficient absorption of heat radiated from the heat generating member 11.

As is described above, the fixing device 10 may fix a toner image on an image forming medium P with heat and pressure by rotating the heat roller (heating member) 12 and the pressure roller (pressurizing member) 13 in their respective rotating directions as indicated by the arrows shown in FIG. 2 and conveying the image forming medium P holding the toner image between the heat roller 12 and the pressure roller 13.

(Circuit Configuration of Fixing Device)

In the following, a circuit configuration for operating the fixing device 10 of FIG. 2 is described with reference to FIG. 3.

Figure 3:
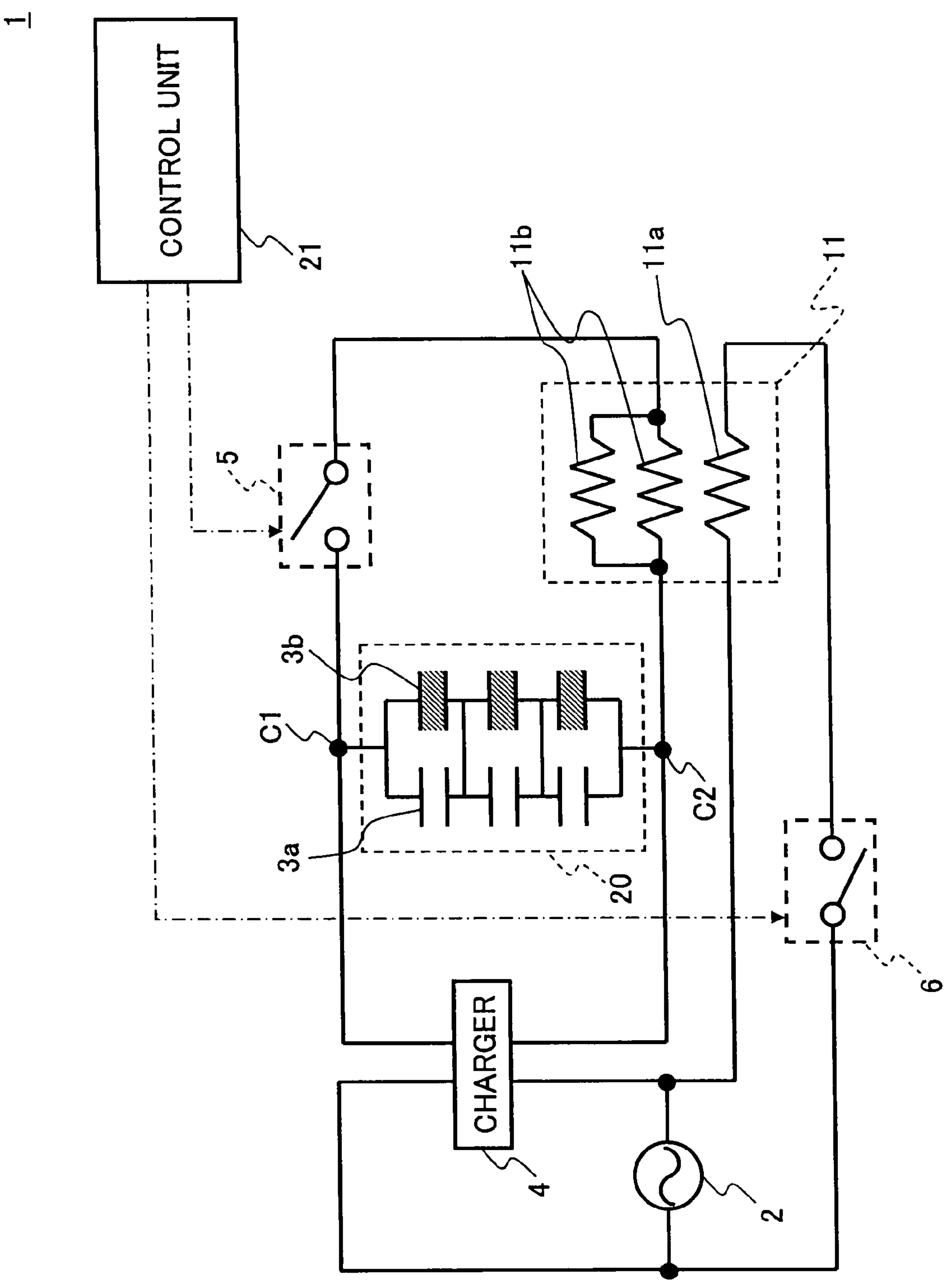
FIG. 3 is a circuit diagram showing a configuration of a circuit for operating the image forming apparatus shown in FIG. 1.

FIG. 3 is a circuit diagram showing an exemplary circuit configuration for operating the fixing device 10 of the image forming apparatus 100 according to the first embodiment of the present invention.

As is shown in FIG. 3, the illustrated circuit 1 for operating the fixing device 10 includes a main power supply 2, an energy storage device 20 corresponding to a rechargeable auxiliary power supply according to an embodiment of the present invention that includes plural types of capacitor cells 3*a* and 3*b*, a charger 4 that charges the energy storage device 20 with electrical power from the main power supply 2, and the heat generating member 11 that generates heat with the electrical power supplied from the main power supply 2 and the energy storage device 20. The circuit 1 is configured such that electrical power is supplied to the heat generating member 11 from the main power supply 2 to enable heat generation when a switch 6 (main power supply control unit) is turned on, and electrical power is supplied to the heat generating member 11 from the energy storage device 20 when a switch 5 (auxiliary power supply control unit) is turned on.

The heat generating member 11 and the energy storage device 20 arranged in the circuit 1 for operating the fixing device 10 are described in detail below.

(Heat Generating Member (Load))

In the present embodiment, the heat generating member 11 of the fixing device 10 is a halogen heater that has a long life owing to the halogen cycle and is capable of efficiently generating heat. The heat generating member 11 has a heat wire arranged inside a glass tube and emits light upon receiving power from a power supply to thereby heat the heat roller (heating member) 12 shown in FIG. 2.

The main heat generating element 11*a* is connected to a main power supply 2, which may be a 100 V power supply in Japan, for example. It is noted that the resistance value of the main heat generating element 11*a* may vary depending on the required power, which may vary depending on the functions and performance of the image forming apparatus 100. For example, if the required power of the image forming apparatus 100 is 120 W, the resistance value of the main heat generating element 11*a* may be approximately 8Ω, and if the required power of the image forming apparatus 100 is 700 W, the resistance value of the main heat generating element 11*a* may be approximately 14 Ω.

Also, in the fixing device 10 according to the present embodiment, plural halogen heaters are used as the auxiliary heat generating element 11*b*. In this way, the resistance value of the auxiliary heat generating element 11*b* may be reduced compared to a case in which one heater is used so that a large amount of power may be supplied thereto with a large current. Also, the auxiliary heat generating element 11*b* may reduce its power by reducing the number of lines connected to a power supply.

In the present embodiment, plural halogen heaters are arranged in parallel within the auxiliary heat generating element 11*b*. Also, the main heat generating element 11*a* and the auxiliary heat generating element 11*b* may each be individually turned on/off by the switch 6 (main power supply control unit) and the switch 5 (auxiliary power supply control unit), respectively.

In one alternative embodiment, the heat generating member 11 may be made of a ceramic heater, and in this case, the heat generating member 11 may be configured to come into contact with the inner side peripheral face of the heat roller (heating member) 12 via a thin film, for example.

(Energy Storage Device)

The energy storage device according to the present embodiment is a rechargeable power supply that uses an electric double layer capacitor, which is capable of achieving a large capacity. It is noted that unlike the secondary battery, chemical reaction does not occur in the capacitor, and accordingly, using a capacitor in an energy storage device may have the following advantages, for example.

Short Charge Time

It is noted that an auxiliary power supply using a secondary battery such as a conventional nickel-cadmium battery requires a charge time of at least a few hours even when charged in rapid charge mode. Accordingly, large power supply operations may only be performed on such an auxiliary power supply a few times every few hours, for example. In contrast, an auxiliary power supply using a capacitor may be charged in several tens of seconds to a few minutes, for example, so that the number of times large power supply operations may be performed over a given time period using this auxiliary power supply may be increased.

Long Life

The number of times a conventional nickel-cadmium battery may be charged/discharged before it breaks down is approximately 500 to 1000 times. Accordingly, the nickel-cadmium battery may reach the end of its life in a relatively short period of time when used as an auxiliary power supply for supplying a large amount of power for the purpose of heating a member, for example. Also, because such a battery has to be exchanged rather frequently, this may be burdensome and costs may be high. In contrast, an auxiliary power supply using a capacitor may be charged/discharged up to 10,000 times before it breaks down and is less prone to degradation due to repeated charge/discharge. Also, unlike the lead battery, for example, the auxiliary using a capacitor does not require liquid exchange or replenishment so that maintenance operations may be simplified.

In the illustrated embodiment of FIG. 3, plural types of capacitor cells 3*a* and 3*b* (collectively referred to as 'capacitor cells 3') are arranged in the energy storage device 20. In one example, the energy storage device 20 may use a first capacitor module 30*a* including forty (40) capacitor cells (first type of capacitor cells) 3*a* each having a capacitance C of 500 F, an internal resistance R of 1 mΩ, and a normalized internal resistance (time constant: CR value) of 0.5 ΩF that are serially connected; and a second capacitor module 30*b* including forty (40) capacitor cells (second type of capacitor cells) 3*b* each having a capacitance C of 1000 F, an internal resistance R of 12 mΩ, and a normalized internal resistance (time constant: CR value) of 12 ΩF that are serially connected. It is noted that the internal resistance of the second type of capacitor cells 3*b* is arranged to be higher than the internal resistance of the first type of capacitor cells 3*a*. Also, the rated voltage of each of the capacitor cells 3*a* and 3*b* of the energy storage device 20 is 2.5 V so that the rated voltage of each of the first and second capacitor modules including forty capacitor cells is 100 V.

It is noted that the energy storage device 20 including plural types of capacitor cells 3 may combine different types of capacitors, such as electric double layer capacitors, non-activated carbon-based capacitors, lithium ion capacitors, pseudo capacitors, and/or hybrid capacitors.

The energy storage device 20 according to the present embodiment is connected in parallel to connection terminals C1 and C2 of the circuit 1 for operating the fixing device 10. The energy storage device 20 is charged with electrical power supplied from the main power supply 2 by the charger, and when the switch 5 is turned on, the charged power is supplied to the auxiliary heat generating element 11*b* at an output voltage of the energy storage device 20.

By arranging the circuit 1 to have the above-described circuit configuration, power may be supplied to the main heat generating element 11*a* of the fixing device 11 from the main power supply 2, and power may be supplied to the auxiliary heat generating element 11*b* of the fixing device 11 from the energy storage device 20. Specifically, power may be simultaneously supplied to the fixing device 11 from both the main power supply 2 and the energy storage device 20. In this way, greater power may be supplied to the fixing device 11 compared to a case in which only the main power supply is used to supply power to the heat generating member 11.

Figure 4:
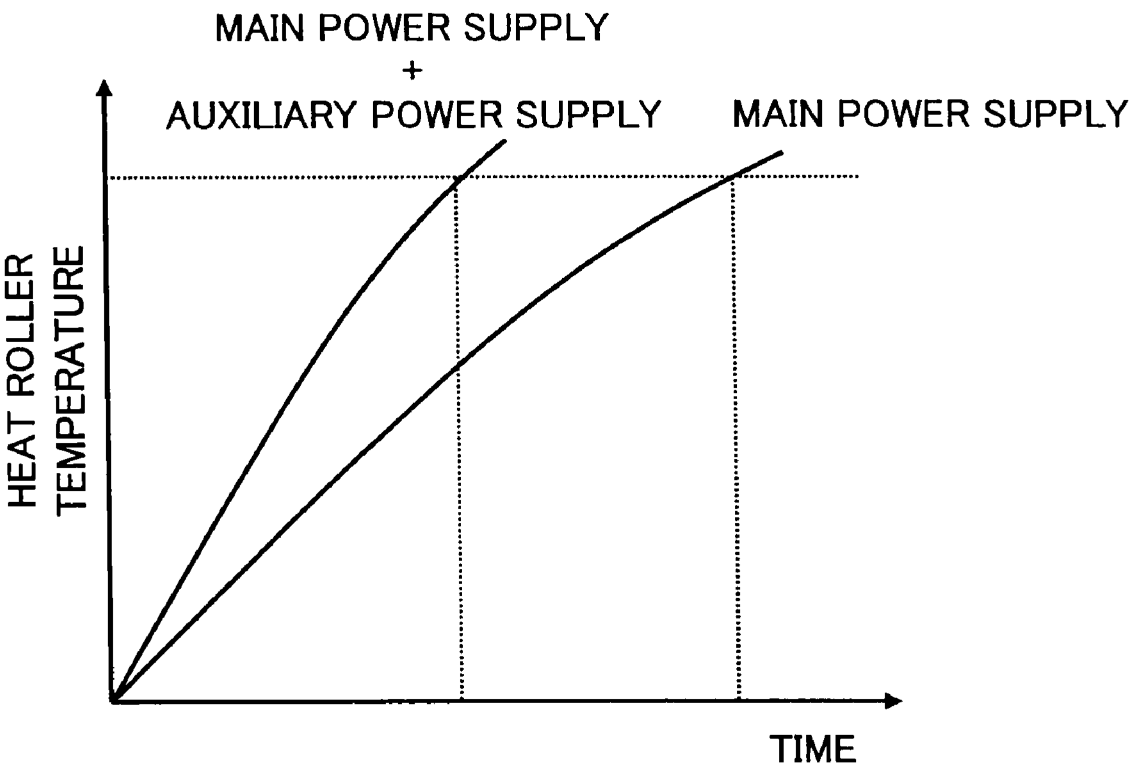
FIG. 4 is a graph showing exemplary temperature characteristics of a heat roller during the rise time of the fixing device of the image forming apparatus shown in FIG. 1.

FIG. 4 is a graph showing exemplary temperature characteristics of the heat roller 12 during the rise time of the fixing device 11 of the image forming apparatus 100 according to the present embodiment.

As can be appreciated from this drawing, the warm-up time required for the heat roller (heating member) 12 of the fixing device 10 of the image forming apparatus 100 to reach a certain temperature is shorter than that required for a heat roller that only receives power from a main power supply. That is, by configuring the heat roller 12 to receive power from both the main power supply 2 and the energy storage device 20 at the same time, the warm-up time of the heat roller 12 may be reduced. In this way, the fixing device 10 may reach its corresponding usage temperature in a short period of time when it is switched on at the beginning of the day or when it is restarted, for example, and the first print time of the image forming apparatus 100 may be reduced.

Referring back to FIG. 3, the circuit 1 for operating the fixing device 10 includes a control unit 21 that controls the operations for supplying power to the heat generating member 11 from the main power supply 2 and the energy storage device 20 as is described in detail below.

(Operations of Fixing Device)

In the following, the operations for supplying power to the fixing device 10 of the image forming apparatus 100 are described with reference to FIG. 5.

Figure 5:
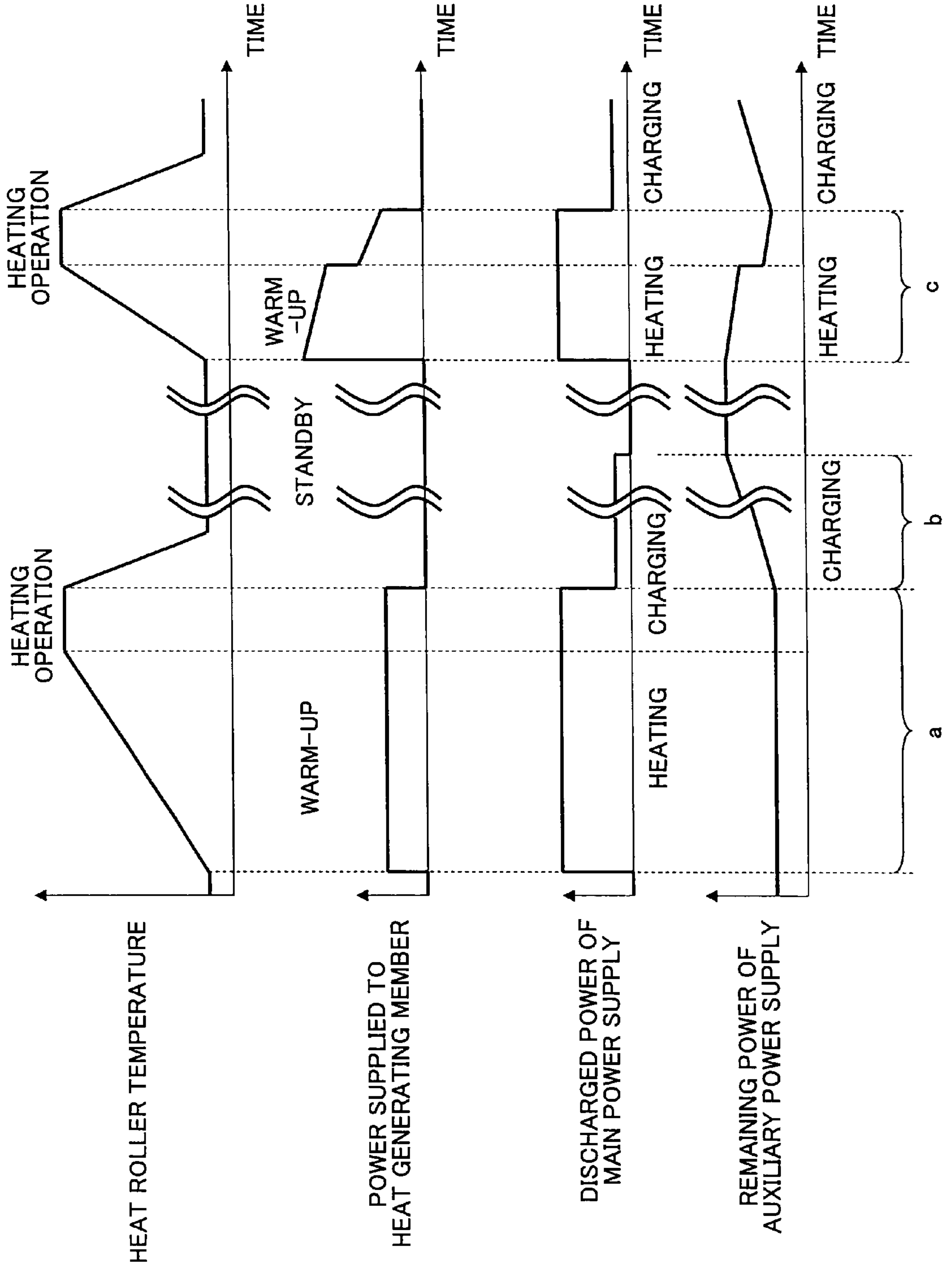
FIG. 5 is a graph illustrating operations of the fixing device of the image forming apparatus shown in FIG. 1.

FIG. 5 is a diagram illustrating exemplary power supply operations of the fixing device 10 of the image forming apparatus 100 according to the present embodiment. It can be appreciated from this drawing that by using both the main power supply 2 and the energy storage device 20, a large amount of power may be supplied to the heat generating member 11 in a relatively short period of time and a fixed amount of power may be supplied to the heat generating member 11 for a relatively long period of time.

(Operations Requiring Large Power)

In FIG. 5, time sections (a) and (c) represent exemplary times when a large amount of power has to be supplied to the heat generating member 11. Specifically, time section (a) represents a case in which warm-up operations are performed when the power of the image forming apparatus 100 is turned on at the beginning of the day, for example, where the energy storage device 20 is not adequately charged, and time section (c) represents a case in which the temperature of the heat roller (heating member) 12 is raised to its corresponding usage temperature by the heat generating member 11 to enable printing operations. In such cases, power may be supplied to the heat generating member 11 (main heat generating element 11*a* and auxiliary heat generating element 11*b*) from both the main power supply 2 and the energy storage device 20 at the same time. In this way, the total amount of power supplied to the heat generating member 11 may be greater than a case in which power is only supplied from the main power supply 2 so that the heat roller (heating member) 12 may be raised to its corresponding usage temperature in a shorter period of time.

To enable such power supply operations, the control unit 21 shown in FIG. 3 may control operations of the circuit 1 according to information indicating the operation status (e.g., operation mode) of the image forming apparatus 100. Specifically, the control unit 21 may turn on a discharge circuit arranged between the main power supply 2 and the main heat generating element 11*b* and transmit a control signal (signal for turning on a switch) to the switch 6 (main power supply control unit) so that power may be supplied to the main heat generating element 11*a* from the main power supply 2. Additionally, the control unit 21 may turn on a discharge circuit arranged between the energy storage device 20 and the auxiliary heat generating element 11*b* and transmit a control signal (signal for turning on a switch) to the switch 5 (auxiliary power supply control unit) so that power may be supplied to the auxiliary heat generating element 11*b* from the main power supply 2.

(Operations Not Requiring Large Power)

In the fixing device 10 according to the present embodiment, during time section (b) shown in FIG. 5 in which the fixing device 10 is in standby mode and the temperature of the heat roller (heating member) 12 does not have to be raised, power may be supplied to the energy storage device 20 from the main power supply 2 via the charger 4.

Also, in a case where the temperature of the heat roller (heating member) 12 is already raised to its corresponding usage temperature, such as when successive printing operations are performed, power may be supplied to the auxiliary heat generating element 11*b* from the energy storage device 20 to maintain the temperature of the heat roller (heating member) 12 to a temperature adequate for maintaining the printing quality of the image forming apparatus 100, for example. In other words, a large amount of power is not required in such a case and the heat roller (heating member) 12 may be maintained at the desired temperature using only one of either the main heat generating element 11*a* or the auxiliary heat generating element 11*b* so that power consumption may be reduced, for example.

To enable such power supply operations, the control unit 21 shown in FIG. 3 may control operations of the circuit 1 according to information indicating the operation status (e.g., operation mode) of the image forming apparatus 100. Specifically, the control unit 21 may turn on a discharge circuit arranged between the energy storage device 20 and the auxiliary heat generating element 11*b* and transmit a control signal (signal for turning on a switch) to the switch 5 (auxiliary power supply control unit) so that power may be supplied to the auxiliary heat generating element 11*b* from the energy storage device 20. Additionally, the control unit 21 may transmit a control signal (signal for turning off a switch) to the switch 6 (main power supply control unit) so that power supply operations to the main heat generating element 11*a* from the main power supply 2 may be stopped.

As can be appreciated from the above descriptions, the control unit 21 shown in FIG. 3 controls on/off operations of the switch 5 (auxiliary power supply control unit) that is arranged at a discharge circuit connecting the energy storage device 20 to the heat generating member 11 (load) and the switch 6 (main power supply control unit) that is arranged at a discharge circuit connecting the main power supply 2 to the heat generating member 11 (load) according to the operation status of the image forming apparatus 100 (e.g., information indicating the operation mode of the image forming apparatus 100). In this way, for example, power supply operations for supplying power from the energy storage device 20 to the fixing device 10 of the image forming apparatus 100 may be controlled so that a large amount of power of approximately 2000 W may be supplied from the energy storage device 20 to the auxiliary heat generating element 11*b* for a relatively short time (e.g., approximately ten seconds) in the case of raising the temperature of the fixing device 10, and a power of approximately a few hundred watts (W) may be supplied from the energy storage device 20 to the auxiliary heat generating element 11*b* for a relatively long time in the case of maintaining the temperature of the fixing device 10.

(Function of Energy Storage Device)

It is noted that structural features for supplying required power to the image forming apparatus 100 from the energy storage device 20 and a method of controlling such power supply operations have been described above.

In the following, the function of the energy storage device 20 for supplying a large amount of power in a short period of time on one hand and supplying power for a long period of time on the other hand is described. Also, measures implemented for reducing the size of the energy storage device 20 while maintaining its power supplying performance are described.

Figure 6:
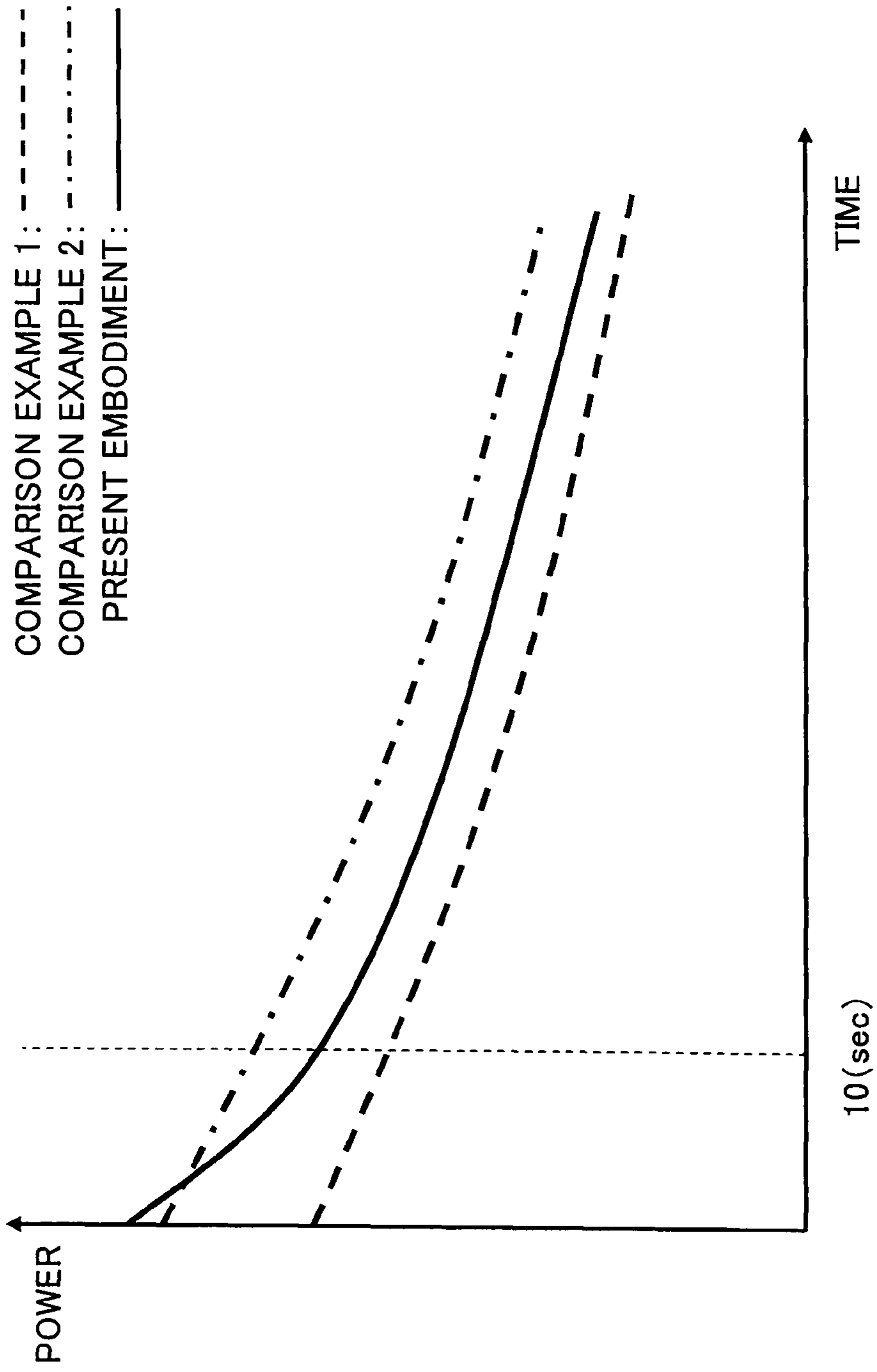
FIG. 6 is a graph showing power supplying characteristics of an energy storage device according to a first embodiment of the present invention and power supplying characteristics of energy storage devices according to comparison examples.

FIG. 6 is a graph illustrating power supplying characteristics of the energy storage device 20 according to an embodiment of the present invention and power supply characteristics of other types of energy storage devices as comparison examples.

(Comparison Conditions)

(1) Conditions of Energy Storage Devices

The energy storage device 20 according an embodiment of the present invention includes plural types of capacitor cells 3. Specifically, in FIG. 6, it is assumed that the energy storage device 20 includes a first capacitor module made up of forty (40) capacitor cells (first type of capacitor cells) 3*a* each having a capacitance C of 500 F, an internal resistance R of 2 mΩ, and a normalized internal resistance (time constant: CR value) of 1 ΩF that are serially connected; and a second capacitor module made up of forty (40) capacitor cells (second type of capacitor cells) 3*b* each having a capacitance C of 1000 F, an internal resistance R of 18 mΩ, and a normalized internal resistance (time constant: CR value) of 18 ΩF that are serially connected. It is noted that the internal resistance of the second type of capacitor cells 3*b* is arranged to be higher than the internal resistance of the first type of capacitor cells 3*a*. Also, the energy density of the first capacitor module indicating the amount of energy per unit volume that may be stored in the first capacitor module is 5 wh/L, the energy density of the second capacitor module is 8 wh/L, and the overall volume of the energy storage device 20 is approximately 7.8 L. Further, it is noted that the combined capacitance of the first type of capacitor cells 3*a* and the second type of capacitor cells 3$b$ of the energy storage device 20 is the same as the capacitance C of the energy storage devices according to the first and second comparison examples described below.

It is assumed that an energy storage device according to the first comparison example is a large capacity low output type energy storage device that includes a capacitor module made up of forty (40) high internal resistance capacitor cells each having a capacitance C of 1500 F, an internal resistance of 12 mΩ, and a normalized internal resistance (time constant: CR value) of 18 ΩF that are serially connected. It is noted that the energy density of the capacitor module used in the energy storage device according to the first comparison example is 8 wh/L and the overall volume of the energy storage device is approximately 6.5 L.

Also, it is assumed that an energy storage device according to the second comparison example is a small capacity high output type energy storage device that includes a capacitor module made up of forty (40) standard internal resistance capacitor cells each having a capacitance C of 1500 F, an internal resistance of 2.7 mΩ, and a normalized internal resistance (time constant: CR value) of 4 ΩF that are serially connected. It is noted that the energy density of the capacitor module used in the energy storage device according to the second comparison example is 6 wh/L and the overall volume of the energy storage device is approximately 8.7 L.

(2) Comparison Environment for Energy Storage Devices

The energy storage devices according to the first and second comparison examples that are subject to comparison with respect to the energy storage device 20 according to an embodiment of the present invention are each connected to the circuit 1 shown in FIG. 3 used for operating the fixing device 10 of the image forming apparatus 100 and controlled to supply power to the auxiliary heat generating element 11$b$ having a resistance of 5Ω. It is assumed that no particular control operations are performed with respect to the power supplied to the auxiliary heat generating element 11$b$.

(Comparison Results)

FIG. 6 illustrates output voltage fluctuations of the energy storage device 20 according to the present embodiment and the energy storage devices according to the first and second comparison examples. Specifically, in FIG. 6, the output power characteristics of the energy storage device 20 according to the present embodiment are represented by a solid line, the output power characteristics of the large capacity low output type energy storage device according to the first comparison example are represented by a dashed line, and the output power characteristics of the small capacity high output type energy storage device according to the second comparison example are represented by a one-dot dashed line.

As is described above, the energy storage device according to the first comparison example is the smallest among the above energy storage devices subject to comparison. However, the energy storage device of the first comparison example has high internal resistance R so that the amount of power output during initial operations is relatively small. An energy storage device having such output power characteristics is typically used for supplying a certain amount of power for a relatively long time period.

On the other hand, the energy storage device according to the second comparison example has a lower internal resistance compared to those of the energy storage device 20 according to the present embodiment and the energy storage device according to the first comparison example so that a relatively large amount of power may be output by this energy storage device during initial operations. However, the size of the energy storage device according to the second comparison example is the largest among the energy storage devices subject to comparison. An energy storage device having such output power characteristics is typically used for supplying a large amount of power in a relatively short period of time.

The energy storage device 20 according to the present embodiment is approximately 10% smaller than the energy storage device according to the second comparison example, and a large amount of power may be output by the energy storage device 20 during initial operations as is illustrated by the solid line of FIG. 6.

As can be appreciated from the above descriptions, by using capacitor cells with a large normalized internal resistance value (time constant: CR value) and a high energy density, the energy storage device 20 according to the present embodiment may be reduced in size compared to the energy storage device according to the second comparison example that only uses capacitor cells with a small normalized internal resistance value (time constant: CR value).

Specifically, by connecting a small capacity high output type capacitor module (first capacitor module) and a large capacity low output capacitor module (second capacitor module) in parallel, the energy storage device 20 according to the present embodiment may be reduced in size and be capable of supplying a large amount of power in a short period of time as well as supplying power for a long period of time.

Also, it is noted that capacitor cells 3$a$ and 3$b$ respectively having differing normalized internal resistance values of 1 ΩF and 18 ΩF are used as the first and second types of capacitor cells in the illustrated energy storage device 20. However, in an alternative embodiment, the ratio between the capacitance C of the first type of capacitor cells and the capacitance C of the second types of capacitor cells may be arranged to be different from the above-described embodiment. In this case, although the output power may be slightly reduced, the overall volume may be reduced further by approximately 20%, for example.

In the following, exemplary arrangements of the capacitor cells of the energy storage device 20 according to the present embodiment are described with reference to FIGS. 7A through 8B.

Figure 7B:
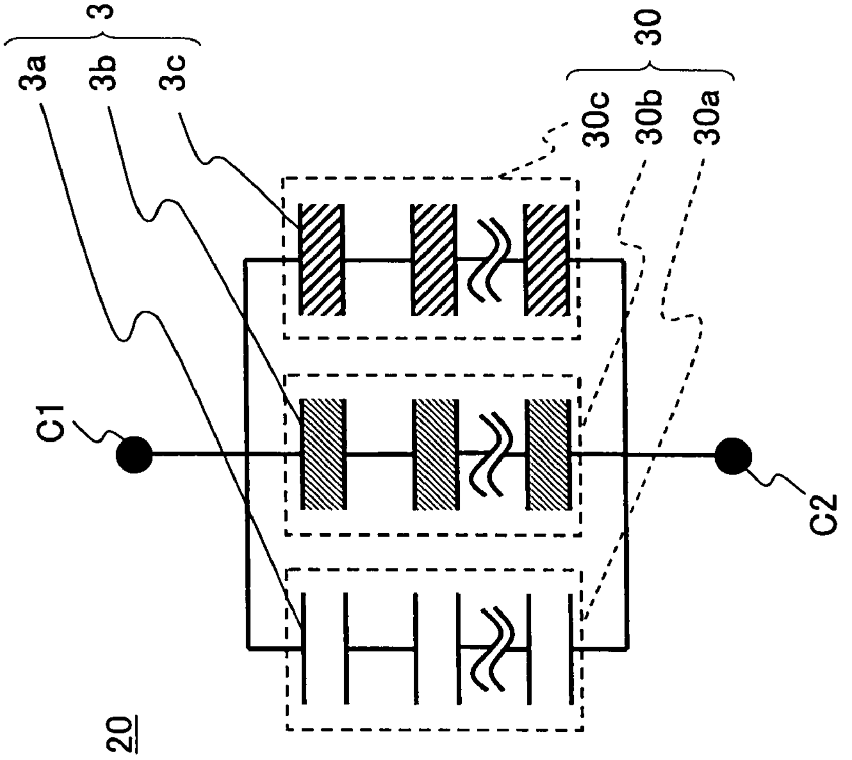
FIGS. 7A and 7B are diagrams showing exemplary capacitor cell arrangements of the energy storage device according to the first embodiment.
Figure 7A:
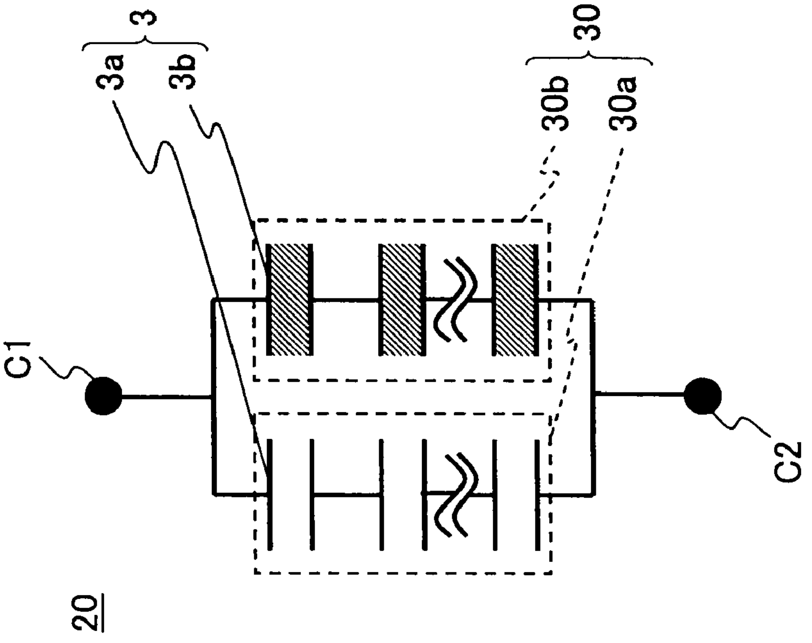

FIG. 7A is a diagram showing one exemplary arrangement of capacitor cells of the energy storage device 20 according to an embodiment of the present invention. In this example, the energy storage device 20 has a small capacity high output type capacitor module (first capacitor module) 30$a$ and a large capacity low output type capacitor module (second capacitor module) 30$b$ that are connected in parallel (collectively referred to as 'capacitor modules 30'). Specifically, the first capacitor module 30$a$ includes forty (40) capacitor cells 3$a$ of a first type with a first normalized internal resistance (time constant) $CR_1$ that are serially connected, and the second capacitor module 30$b$ includes capacitor cells 3$b$ of a second type with a relatively higher second normalized internal resistance (time constant) $CR_2$ that are serially connected. In other words, capacitor cells 3$a$ and 3$b$ having differing normalized internal resistance values are each serially connected to make up the first capacitor module 30$a$ and the second capacitor module 30$b$, respectively.

FIG. 7B is a diagram showing another exemplary arrangement of the capacitor cells of the energy storage device 20 according to an embodiment of the present invention. In this example, a third type of capacitor cells 3$c$ is used in addition to the first type of capacitor cells 3$a$ and the second type of capacitor cells 3$b$ used in FIG. 7A. The first type of capacitor cells 3$a$, the second type of capacitor cells 3$b$, and the third type of capacitor cells 3$c$ are each serially connected to make up a first capacitor module 30*a*, a second capacitor module 30*b*, and a third capacitor module 30*c*, respectively.

It is noted that the energy storage device 20 according to the present embodiment includes connection terminals C1 and C2 to which plural capacitor modules 30 are connected in parallel. The connection terminals C1 and C2 are arranged to enable the energy storage device 20 to be detached from the image forming apparatus 100.

Figure 8B:
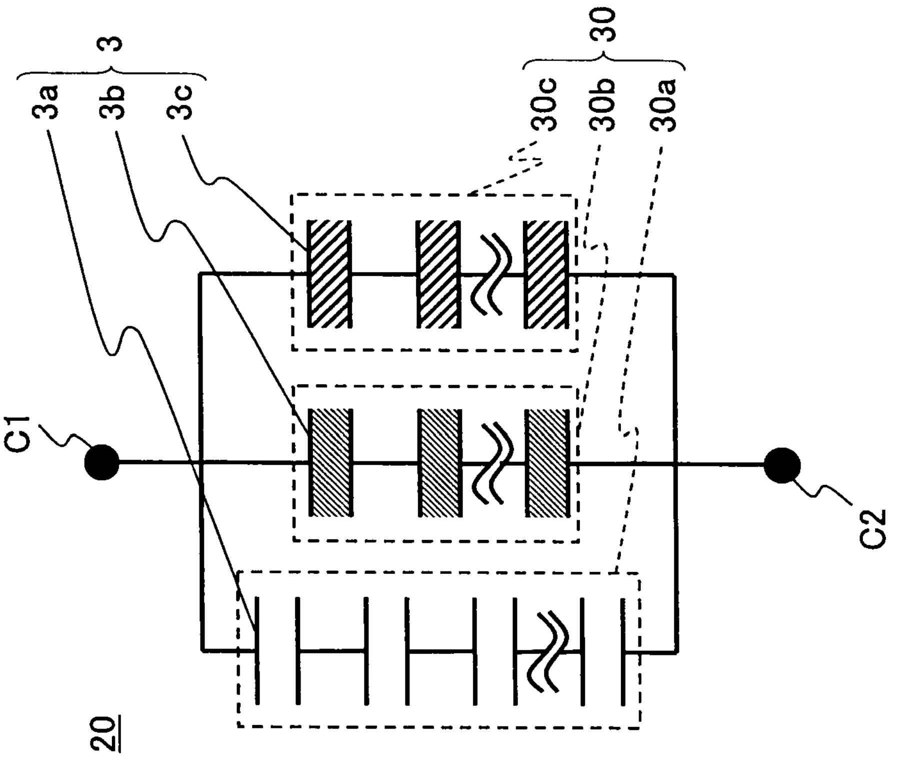
FIGS. 8A and 8B are diagrams showing other exemplary capacitor cell arrangements of the energy storage device according to the first embodiment.
Figure 8A:
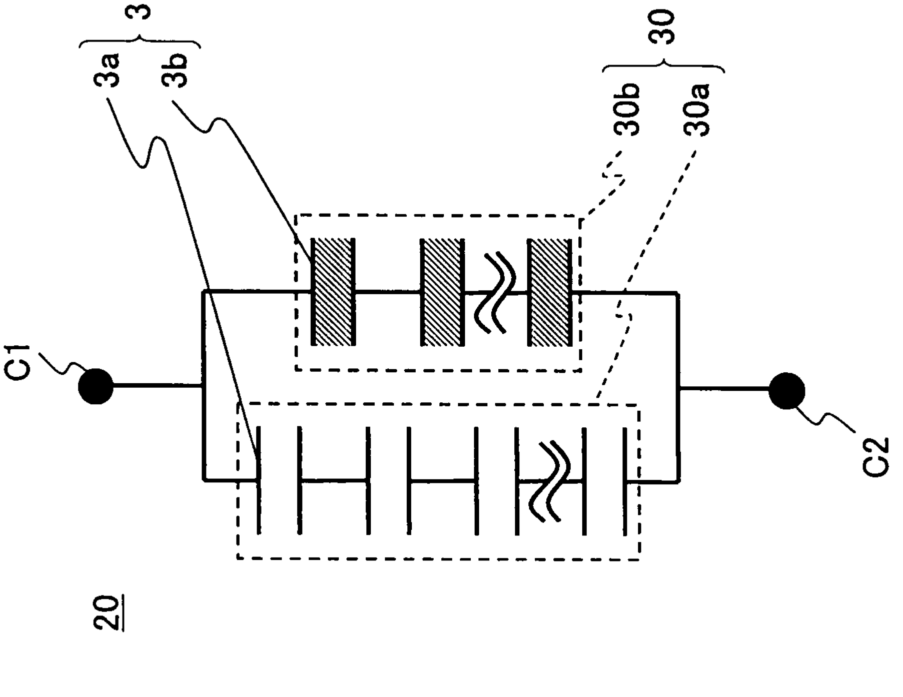

FIGS. 8A and 8B are diagrams showing other exemplary arrangements of capacitor cells 3 of the energy storage device 20 according to the present embodiment. As is shown in these drawings, the number of capacitor cells 3 included in each capacitor module 30 may vary. For example, the number of the first type of capacitor cells 3*a* included in the first capacitor module 30*a* may be greater than the number of the second type of capacitor cells 3*b* included in the second capacitor module 30*b*.

(Reducing Capacitor Cells in Capacitor Module with Higher Rated Voltage)

In the following descriptions, it is assumed that the energy storage device 20 according to an embodiment of the present invention includes a first capacitor module 30*a* that is made up of capacitor cells 3*a* of a first type having a rated voltage of 2.3 V and a normalized internal resistance of 1.5 ΩF (capacitance C of 500 F and internal resistance R of 3 mΩ), and a second capacitor module 30*b* that is made up of capacitor cells 3*b* of a second type having a rated voltage of 2.7 V and a normalized internal resistance of 5 ΩF (capacitance C of 500 F and internal resistance R of 10 mΩ).

In a case where the rated voltage of each of the first and second capacitor modules 30*a* and 30*b* is set to 99 V, the first capacitor module 30*a* may require forty-four (44) capacitor cells 3*a* of the first type, and the second capacitor module 30*b* may require thirty-seven (37) capacitor cells 3*b* of the second type.

In this case, if the first and second capacitor modules 30*a* and 30*b* each include forty-four (44) capacitor cells, the volume and cost of the second capacitor module 30*b* including capacitor cells 3*b* with a rated voltage of 2.7 V may be unnecessarily increased. Specifically, the volume of the second capacitor module 30*b* having forty-four capacitor cells 3*b* is increased by the volume of seven excessive capacitor cells 3*b*. Also, even though the second capacitor module 30*b* having forty-four capacitor cells 3*b* can be charged at a voltage of up to 118 V, only around 70% of this voltage (i.e., 99 V) is actually used.

Accordingly, in a preferred embodiment, the number of serially connected capacitor cells 3*a* having a smaller normalized internal resistance (time constant: CR value) and a lower rated voltage is arranged to be greater than the number of serially connected capacitor cells 3*b* having a larger normalized internal resistance (time constant: CR value) and a higher rated voltage. In other words, different types of capacitor cells 3*a* and 3*b* are serially connected in their corresponding capacitor modules 30*a* and 30*b* in different numbers. In this way, the volume of the energy storage device 20 corresponding to the combined volume of the capacitor modules 30*a* and 30*b* may be reduced, for example.

(Varying the Number of Capacitor Cells According to Electrolyte Solution)

It is noted that the number of capacitor cells 3 included in a capacitor module 30 may be arranged to vary according to properties of the electrolyte solution used in the capacitor cells 3. For example, the electrolyte solution may be categorized into an aqueous electrolyte solution and an organic electrolyte solution. In the following descriptions, it is assumed that the first type of capacitor cells 3*a* correspond to aqueous capacitor cells using an aqueous electrolyte solution and the second type of capacitor cells 3*b* correspond to organic capacitor cells using an organic electrolyte solution.

For example, although an electric double layer capacitor using an aqueous electrolyte solution may have a relatively high internal resistance R owing to its ion mobility, its rated voltage may be relatively low at approximately 1.2 V owing to water electrolysis. On the other hand, the rated voltage of an electric double layer capacitor cell using an organic electrolyte solution may be approximately 2.3 V so that the number of aqueous capacitor cells 3*a* is preferably arranged to be at least two times greater than the number of organic capacitor cells 3*b*.

As can be appreciated from the above descriptions, in a preferred embodiment, the number of serially connected capacitor cells 3*a* having a smaller normalized internal resistance (time constant: CR value) and a lower rated voltage is arranged to be greater than the number of serially connected capacitor cells 3*b* having a larger normalized internal resistance (time constant: CR value) and a higher rated voltage.

(Further Limitations on Capacitor Cell Characteristics)

In the above-described embodiments, the number of serially connected capacitor cells 3*a* having a smaller normalized internal resistance (time constant: CR value) and a lower rated voltage is arranged to be greater than the number of serially connected capacitor cells 3*b* having a larger normalized internal resistance (time constant: CR value) and a higher rated voltage in the energy storage device 20. In a further preferred embodiment, additional characteristics of the capacitor cells 3 are taken into consideration in varying the number of serially connected capacitor cells 3 of different types.

Specifically, with respect to the energy storage device 20 according to an embodiment of the present invention using different types of capacitor cells 3 having different normalized internal resistance values (time constants: CR values) that are serially connected in different numbers, the different types of capacitor cells 3 are preferably arranged to have further differing characteristics determined by a value (in units of ΩF/V) obtained by dividing the normalized internal resistance (time constant: CR value) by the rated voltage of each of the different types of capacitor cells 3. In one preferred embodiment, different types of capacitor cells 3*a* and 3*b* having different normalized internal resistance values (time constant: CR value) as well as different values of ΩF/V are serially connected in different numbers within capacitor modules 30*a* and 30*b*, respectively, and the capacitor modules 30*a* and 30*b* are connected in parallel.

It is noted that the number of capacitor cells 3 that are required in a given capacitor module 30 may vary depending on the rated voltage of the capacitor cells 3 even if the normalized internal resistance value (time constant: CR value) of the capacitor cells 3 is the same, and the above-described configuration may be used to secure desirable effects even when the difference in the internal resistance R of the capacitor modules 30 is reduced, for example.

Specifically, with respect to capacitor cells 3 with a capacitance C of 500 F and an internal resistance R of 1 mΩ, for example, if thirty (30) aqueous capacitor cells 3 with a rated voltage of 1.2 V are serially connected, the combined internal resistance of the resulting capacitor module 30 may be 30 mΩ; and if ten (10) organic capacitor cells 3 with a rated voltage of 2.6 V are serially connected, the combined internal resistance of the resulting capacitor module 30 may be 10 mΩ. Thus, the number of required capacitor cells 3 may not be readily determined based merely on the normalized internal resistance (time constant: CR value) of the capacitor cells 3.

Accordingly, a value (in units of ΩF/V) obtained by dividing the normalized internal resistance (time constant: CR value) by the rated voltage of each type of capacitor cells 3 is preferably used in configuring the energy storage device 20 according to an embodiment of the present invention that includes different types of capacitor cells 3 with different normalized internal resistance values (time constants: CR values).

In the energy storage device 20 according to an embodiment of the present invention, different types of capacitor cells 3 with different normalized internal resistance values (time constants: CR values) are each serially connected to form plural capacitor modules 30, and these capacitor modules 30 are connected in parallel by connection terminals C1 and C2. By having the control unit 21 control the switch 5 of the circuit 1 for operating the fixing device 10 according to the operation status of the image forming apparatus 100, the energy storage device 20 may be controlled to supply power to the auxiliary heat generating element 11*b* as is necessary via the connection terminals C1 and C2.

Accordingly, the energy storage device 20 according to the present embodiment may be reduced in size compared to a conventional energy storage device and be configured to have functions of supplying a large amount of power in a relatively short period of time as well as supplying power for a relatively long period of time. In this way, the overall size of the image forming apparatus 100 according to an embodiment of the present invention may be reduced, for example.

(Power Supply Operations of Energy Storage Device)

As can be appreciated from the above-descriptions, in the energy storage device 20 according to an embodiment of the present invention, capacitor cells 3*a* of a first type and capacitor cells 3*b* of a second type with differing normalized internal resistance values (time constants: CR values) are each serially connected to form a first capacitor module 30*a* and a second capacitor module 30*b*, respectively, and the first capacitor module 30*a* and the second capacitor module 30*b* are further connected in parallel. In the following, power supply operation procedures of such an energy storage device 20 according to the present embodiment are described.

(Procedure 1) Switch Control According to Operation Status

In the image forming apparatus 100 according to the present embodiment, the control unit 21 transmits an on/off control signal to the switch 5 of the circuit 1 for operating the fixing device 10 receiving power supplied from the energy storage device 20 according to the operation status of the image forming apparatus 100 (e.g., information indicating the operation mode of the image forming apparatus 100).

(Procedure 2) Discharge from the Energy Storage Device

When the switch 5 (auxiliary power supply control unit) is turned on through control operations by the control unit 21, the energy storage device 20 according to the present embodiment supplies power to the heat generating member 11 of the fixing device 10 via the circuit 1 for operating the fixing device 10.

By performing the above-described Procedures 1 and 2, the image forming apparatus 100 may turn on/off the switch 5 (auxiliary power supply control unit) of the circuit 1 for operating the fixing device 10 according to its operation status to control power supply operations for supplying power from the energy storage device 20 to the heat generating element 11 of the fixing device 10.

It is noted that the energy storage device 20 according to the present embodiment may be reduced in size compared to a conventional energy storage device. Additionally, depending on the operation status of the image forming apparatus 100, the energy storage device 20 may supply a large amount of power in a short period of time when operations of the image forming apparatus 100 require a large amount of power (e.g., during rise time or printing operations start time), and the energy storage device 20 may supply power for a long period of time when operations of the image forming apparatus 100 do not require a large amount of power (e.g., during successive printing operations), for example.

Second Embodiment

According to a second embodiment of the present invention, discharge/charge operations of an energy storage device for supplying power to a fixing device of an image forming apparatus are controlled based on information indicating the charge status of the energy storage device as well as information indicating the operation status of the image forming apparatus.

In other words, the second embodiment differs from the above-described first embodiment in that it uses information indicating the charge status of the energy storage device in controlling discharge/charge operations of an energy storage device that includes different types of capacitor cells having different internal resistance values and is configured to be capable of supplying a large amount of power in a short period of as well as supplying power over a long period of time without being increased in size.

It is noted that in the following descriptions, elements of the second embodiment that are identical to or have features corresponding to those of the first embodiment are referred to by the same reference numbers and their descriptions may be simplified or omitted.

(Circuit Configuration of Fixing Device)

Figure 9:
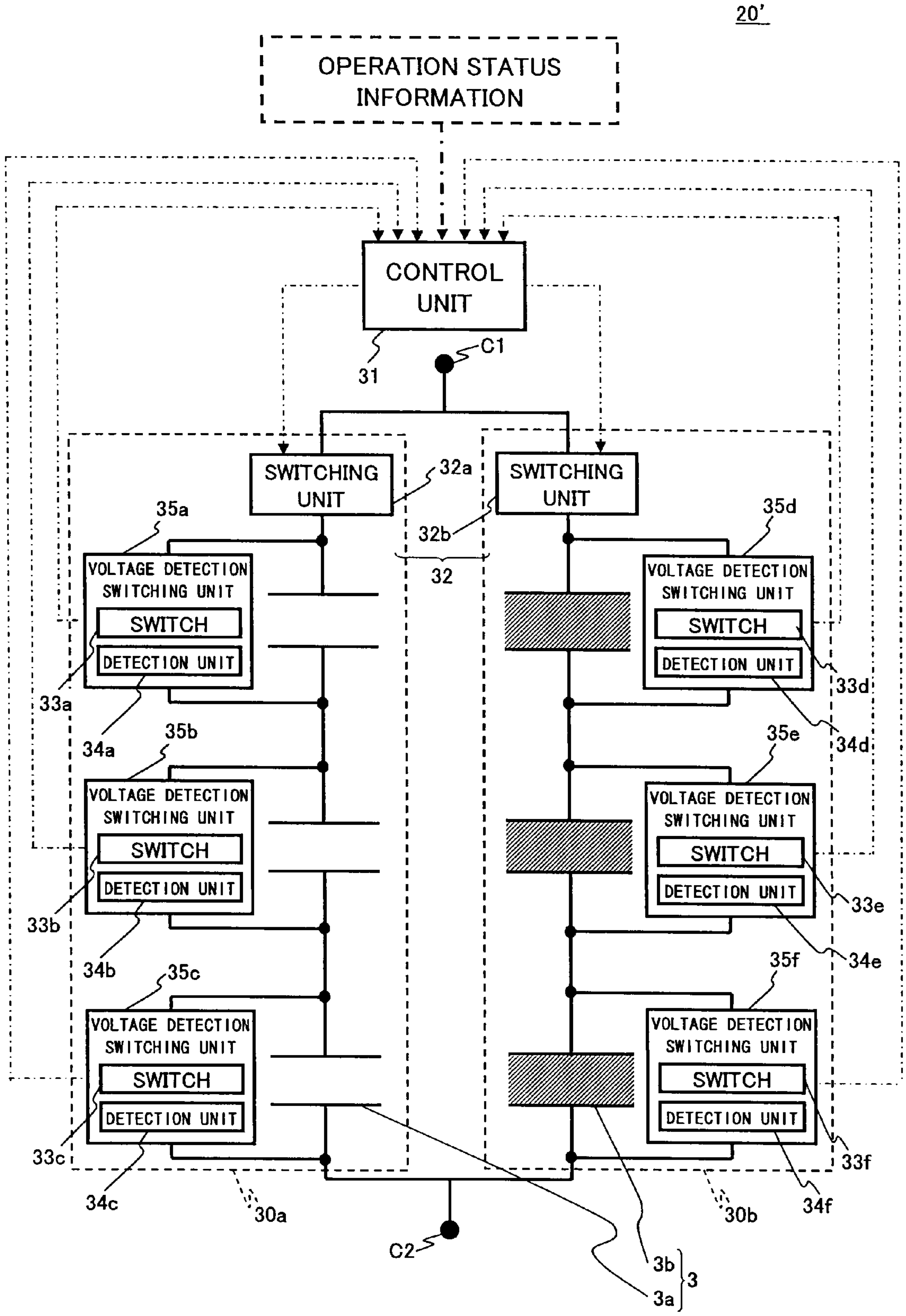
FIG. 9 is a circuit diagram showing circuit elements associated with operations of an energy storage device according to a second embodiment of the present invention.

FIG. 9 is a circuit diagram showing exemplary circuit elements associated with operations of an energy storage device 20' according to the second embodiment.

As is shown in this drawing, the energy storage device 20' according to the second embodiment includes a control unit 31, switching units 32, and voltage detection switching units 35 in addition to the elements included in the energy storage device 20 according to the first embodiment as shown in FIGS. 3, 7, and 9. By including the above additional elements, discharge/charge operations of the energy storage device 20' may be controlled according to information indicating the charge status of the energy storage device 20', and the energy storage device 20' may be configured to have functions of supplying a large amount of power in a relatively short period of time as well as supplying power for a relatively long period of time without being enlarged.

The control unit 31 is configured to acquire information indicating the operation status (e.g., operation mode) of the image forming apparatus 100 and information indicating the charge status (e.g., voltage value) of the energy storage device 20' detected by the voltage detection switching unit 35; determine the power required by the image forming apparatus 100 based on a threshold value or control information associated with the above items of information; and transmit a control signal to switches (e.g., switching unit 32) arranged on a charge/discharge circuit associated with operations of the energy storage device 20'.

The switching units 32*a* and 32*b* (collectively referred to as 'switching unit 32') are configured to receive the control signal transmitted from the control unit 31; and turn on/off a discharge circuit arranged between the auxiliary heat generating element 11*b* and the first capacitor module 30*a* or the second capacitor module 30*b* of the energy storage device 20' according to the received control signal. As is shown in FIG. 9, the switching unit 32 is arranged between the connection terminal C1 and the capacitor module 30*a* or 30*b* to control charge/discharge operations of the capacitor module 30*a* or 30*b*.

The voltage detection switching units 35*a*-35*f* (collectively referred to as 'voltage detection switching unit 35') are each connected to two opposing ends of the capacitor cells 3*a* or 3*b*, respectively. The voltage detection switching units 35*a*-35*f* respectively include switches 33*a*-33*f* for switching on/off operations for bypassing the current flowing between the two opposing ends of the corresponding capacitor cell 3*a* or 3*b* and detection units 34*a*-34*f* for detecting the voltage between the two opposing ends. For example, the voltage detection switching unit 35 may be an electronic component having two electrodes, such as a varistor, that has a high resistance at low voltages and a low resistance at high voltages. It is noted that although the voltage detection switching unit 35 is connected to each of the capacitor cells 3 in the illustrated example, in other examples, the voltage detection switching unit 35 may be connected to opposing ends of a set of plural adjacent capacitor cells 3 or opposing ends of the capacitor module 30*a* or 30*b*.

In the present example, the voltage detection switching unit 35 detects the voltage between the two opposing ends of the capacitor cell 3 to which it is connected on the circuit via the detection unit 34 and conveys the detection result to the control unit 31. It is noted that the resistance of a varistor suddenly decreases when a voltage increases to a certain level or higher. For example, the detection unit 34 may rely on such a property of the varistor in detecting the voltage. The control unit 31 receives information indicating the sudden change in the resistance detected by the detection unit 34 as a detection result.

Also, the voltage detection switching unit 35 is configured to control bypassing of the current flowing through the circuit by turning on/off the switch 33 according to the detection result detected by the detection unit 34.

In the following, exemplary charge/discharge operations of the energy storage device 20' according to the present embodiment including the above-described control unit 31, the switching units 32*a* and 32*b*, and the voltage detection switching units 35*a*-35*f* are described.

(Discharge Control Operations)

For example, provided that the first type of capacitor cells 3*a* of the energy storage device 20' according to the present embodiment correspond to the small capacity high output type capacitor cells and the second type of capacitor cells 3*b* correspond to the large capacity low output type capacitor cells, when the control unit 31 determines based on operation status information of the image forming apparatus 100 that a large amount of power has to be supplied to the fixing device 10, such as during rise time of the image forming apparatus 100 or warm-up time of the fixing device 10 for starting printing operations (when the switches 5 and 6 as the auxiliary power supply control unit and the main power supply control unit of FIG. 3 are turned on), the switching unit 32*a*, which is arranged within a discharge circuit connected between the first capacitor module 30*a* including the first type of capacitor cells 3*a* and the auxiliary heat generating element 11*b* receiving power supplied from the energy storage device 20', is switched on according to a control signal that is transmitted from the control unit 31 so that power is discharged from the first capacitor module 30*a*.

Further, the switching unit 32*b*, which is arranged within a discharge circuit connected between the second capacitor module 30*b* including the second type of capacitor cells 3*b* and the auxiliary heat generating element 11*b* receiving power supplied from the energy storage device 20', is switched on according to a control signal that is transmitted from the control unit 31 so that power is discharged from the second capacitor module 30*b*.

When the control unit 31 determines based on operation status information of the image forming apparatus 100 that a large amount of power does not have to be supplied to the fixing device 10, such as during operations for maintaining the temperature of the fixing device 10 to a certain temperature when successive printing operations are being performed (when the switches 5 and 6 as the auxiliary power supply control unit and the main power supply control unit of FIG. 3 are turned on), the switching unit 32*a*, which is arranged within the discharge circuit connected between the first capacitor module 30*a* and the auxiliary heat generating element 11*b*, is switched off according to a control signal that is transmitted from the control unit 31 so that power discharge operations of the first capacitor module 30*a* are stopped. Further, the switching unit 32*b*, which is arranged within the discharge circuit connected between the second capacitor module 30*b* and the auxiliary heat generating element 11*b*, is switched on according to a control signal that is transmitted from the control unit 31 so that power is discharged from the second capacitor module 30*b*.

Also, during power discharge operations, the voltage detection switching unit 35 detects the voltage between the opposing ends of the capacitor cell 3 via the detection unit 34, and if the detected voltage value is less than a predetermined threshold value, the switch 33 is turned on according to the detection result so that the current flowing between the opposing ends of the capacitor cell 3 is bypassed.

In this way, the energy storage device 20' according to the present embodiment may perform power discharge operations using a suitable number of capacitor modules 30 of the plural capacitor modules 30 included in the energy storage device 20' in accordance with the amount of power required by the fixing device 10 based on information indicating the operation status of the image forming apparatus 100. Also, in the present embodiment, over-discharge of the capacitor cell 3 during discharge operations may be prevented based on information indicating the charge status (e.g., voltage value) of the capacitor cell 3.

(Charge Control)

Based on information indicating the operation status of the image forming apparatus 100, if the control unit 31 determines that auxiliary power does not have to be supplied to the fixing device 10, such as during standby mode of the apparatus (when the switch 5 as the auxiliary power supply control unit is turned off and the switch 6 as the main power supply control unit is turned on), the control unit 31 determines whether the voltage value detected by the voltage detection switching unit 35 is less than a predetermined threshold value.

If the detected voltage is less than the predetermined threshold value, the switching units 32*a* and 32*b* are switched on according to control signals transmitted from the control unit 31 so that power is charged to the first and second capacitor modules 30*a* and 30*b*.

During such charge operations, the voltage detection switching unit 35 detects the voltage between the opposing ends of the capacitor cell 3 via the detection unit 34, and when the detected voltage is greater than a predetermined threshold value, the switch 33 is switched on in accordance with such a detection result so that the current flowing between the opposing ends of the cell 3 is bypassed.

Also, the control unit 31 determines whether the voltage value detected by the voltage detection switching unit 35 is greater than the predetermined threshold value.

In this way, the energy storage device 20' according to the present embodiment may perform charge operations for the plural capacitor modules 30 at suitable timings based on information indicating the operation status of the image forming apparatus 100 and information indicating the charge status (e.g., voltage value) of the capacitor cell 3. Also, according to the present embodiment, over-charging of the capacitor cell 3 during charge operations may be prevented.

As can be appreciated from the above-descriptions, the energy storage device 20' according to the present embodiment is configured to control charge/discharge operations according to information indicating the operation status of the image forming apparatus 100 and information indicating the charge status (e.g., voltage value) of the energy storage device 20'. In this way, the energy storage device 20' may be capable of supplying a large amount of power in a relatively short period of time as well as supplying power for a relatively long period of time without increasing its size.

(Power Supply Operations of Energy Storage Device)

In the following, operation procedures are described for executing the functions of the energy storage device 20' according to the second embodiment of the present invention that has capacitor cells 3*a* of a first type and capacitor cells 3*b* of a second type with differing normalized internal resistance values (time constants: CR values) each serially connected to form a first capacitor module 30*a* and a second capacitor module 30*b* that are further connected in parallel.

(Procedure 1) Switch Control According to Operation Status

In the image forming apparatus 100 according to the present embodiment, the control unit 21 transmits an on/off control signal to the switch 5 of the circuit 1 for operating the fixing device 10 receiving power supplied from the energy storage device 20' according to the operation status of the image forming apparatus 100 (e.g., information indicating the operation mode of the image forming apparatus 100).

(Procedure 2) Switch Control According to Operation Status and Charge Status

In the energy storage device 20' according to the present embodiment, control signals are transmitted by the control unit 31 according to operation status information and/or charge status information (e.g., information indicating the operation status, such as the operation mode, of the image forming apparatus 100 and/or information indicating the charge status, such as a voltage value, of the energy storage device 20'), and the switching units 32*a* and 32*b*, which are arranged within discharge circuits connected between the connection terminal C1 and the first and second capacitor modules 30*a* and 30*b*, are switched on/off according to the control signals so that charge/discharge operations of the capacitor modules 30*a* and 30*b* may be controlled.

Also, according to the present embodiment, the voltages between two opposing ends of capacitor cells 3 are detected as information indicating the charge status of the energy storage device 20' by the voltage detection switching units 35*a*-35*f* respectively including switches 33*a*-33*f* for bypassing the current flowing between the two opposing ends of corresponding capacitor cells 3 and detection units 34*a*-34*f* for detecting the voltage between the opposing ends, and operations for bypassing the current flowing between the opposing ends of the capacitor cells 3 are switched on/off according to the detected voltage.

(Procedure 3) Charge/Discharge Operations of Energy Storage Device

The energy storage device 20' according to the present embodiment is configured to supply power to the heat generating member 11 of the fixing device 10 (discharge operations) or receive power from the charger 4 (charge operations) via the circuit 1 for operating the fixing device 10 according to Procedure 2 described above.

As can be appreciated from the above descriptions, in the image forming apparatus 100 according to the second embodiment, the above-described Procedures 1-3 are performed to switch on/off the switching units 32*a* and 32*b* of the circuit 1 for operating the fixing device 10 and the switches 33*a*-33*f* of the voltage detection switching units 34*a*-34*f* according to the operation status of the image forming apparatus 100 and the charge status of the energy storage device 20' to supply power to the heat generating member 11 of the fixing device 10 from the energy storage device 20' (discharge operations) or charge power to the energy storage device 20' from the charger 4.

It is noted that the energy storage device 20' according to the present embodiment may be reduced in size compared to a conventional energy storage device. Additionally, the energy storage device 20' may supply a large amount of power in a short period of time when operations of the image forming apparatus 100 require a large amount of power (e.g., during rise time or printing operations start time), and the energy storage device 20' may supply power for a long period of time when operations of the image forming apparatus 100 do not require a large amount of power (e.g., during successive printing operations), for example. Further, in the energy storage device 20' according to the present embodiment, overcharging and over-discharging of the capacitor cells 3 during charge/discharge operations may be prevented so that the energy storage device 20' may maintain stable performance for a relatively long period of time.

It is noted that in the above descriptions, the present invention is illustratively represented by the energy storage device 20 according to the first embodiment and the energy storage device 20' according to the second embodiment that are used in an image forming apparatus 100. However, the present invention is not limited to such embodiments and an energy storage device according to an embodiment of the present invention may equally be used in other types of apparatuses that require power to be supplied at fluctuating levels according to the apparatus operation status, for example.

Also, it is noted that in the above-described first and second embodiments, power output from the energy storage device 20/20' is supplied to the fixing device 10 of the image forming apparatus 100. However, the present invention is not limited to such an arrangement, and in alternative embodiments, power from an energy storage device may be supplied to a device other than the fixing device 10, such as a motor drive unit. In another embodiment, considering the fact that the fixing device 10 typically requires the greatest amount of power among the component devices of the image forming apparatus 100, power supply operations to the fixing device 10 may be given priority and when the fixing device 10 does not require a large amount of power, some other device of the image forming apparatus 100 may be configured to receive power output from an energy storage device of the image forming apparatus 100. In such an embodiment, a determination may be made as to whether the fixing device 100 requires a large amount of power based on information indicating the operation status of the image forming apparatus 100, and power supply destinations may be switched according to the determination result, for example.

Also, it is noted that in the above-described first and second embodiments of the present invention, the power output from the energy storage device 20/20' is controlled by switches arranged within charge/discharge circuits connecting the energy storage device 20/20' to the heat generating element 11. However, the present invention is not limited to such an arrangement. Specifically, in one alternative embodiment, a device for raising/lowering the voltage output from an energy storage device according to an embodiment of the present invention may be arranged in the charge/discharge circuit connecting the energy storage device to its power supply destination so that power supply operations at a wider range of power supply levels may be enabled using the device for raising/lowering the output voltage of the energy storage device, for example.

In the following, embodiments of the present invention are described in relation to their advantageous effects.

An energy storage device according to an embodiment of the present invention includes capacitor cells of a first type having a first internal resistance and capacitor cells of a second type having a second internal resistance which is higher than the first internal resistance.

By including capacitor cells with a high internal resistance and capacitor cells with a low internal resistance in the energy storage device as in the above embodiment, the energy storage device may be capable of supplying a large amount of power in a relatively short period of time as well as supplying power for a relatively long period of time without increasing its size.

Accordingly, the energy storage device according to the above embodiment may be reduced in size while maintaining its capability of supplying power according to the operation status of the apparatus in which it is used. In turn, the overall size of the apparatus using the energy storage device according to the present embodiment may be reduced.

In an energy storage device according to one preferred embodiment of the present invention, the capacitor cells of the first type are serially connected to form a first capacitor module, the capacitor cells of the second type are serially connected to form a second capacitor module, and the first capacitor module and the second capacitor module are connected in parallel.

By implementing such a configuration, a counter current may be prevented from flowing between the capacitor cells of the energy storage device having differing internal resistances, for example.

In an energy storage device according to another preferred embodiment, the number of capacitor cells of the first type included in the first capacitor module is arranged to be different from the number of capacitor cells of the second type included in the second capacitor module.

By implementing such a configuration, even when capacitor cells with differing rated voltages are included in the energy storage device, the number of the capacitor cells may be adjusted in consideration of their rated voltages so that the capacitor cells may be effectively. In this way, the overall voltage of the capacitor modules may be increased and the size of the energy storage device may be reduced, for example.

An energy storage device according to another preferred embodiment further includes:

a switch for turning on/off a first discharge circuit that is arranged between a load and the first capacitor module or a second discharge circuit that is arranged between the load and the second capacitor module; and a control unit that transmits a control signal to the switch and controls discharge operations of the first capacitor module or the second capacitor module based on information indicating the operation status of the apparatus using the energy storage device.

An energy storage device according to another preferred embodiment further includes:

a detection unit that detects a voltage value between two opposing ends of at least one of the capacitor cells of the first type or at least one of the capacitor cells of the second type; and a control unit that controls discharge operations of the capacitor cell(s) of the first type or the capacitor cell(s) of the second type when the voltage value detected by the detection unit is greater than a predetermined threshold value.

An energy storage device according to another preferred embodiment includes:

a voltage detection switching unit that integrates a switch arranged between two opposing ends of at least one of the capacitor cells of the first type or at least one of the capacitor cells of the second type, and a detection unit that detects a voltage value between the two opposing ends of the capacitor cell(s) of the first type or the capacitor cell(s) of the second type; wherein the voltage detection switching unit is configured to turn on/off the switch according to the voltage value detected by the detection unit and control charge operations of the capacitor cell(s) of the first type or the capacitor cell(s) of the second type.

By implementing such a configuration, overall charge/discharge operations of the energy storage device may be controlled based on a voltage value between two opposing ends of a capacitor cell, a block of adjacent capacitor cells, or a capacitor module (as charge status information) and information indicating the operation status of the apparatus using the energy storage device.

In this way, over-charge, over-discharge, or reverse voltage may be prevented from occurring in the capacitor cells of the energy storage device, for example.

An image forming apparatus according to an embodiment of the present invention includes:

a charge device that charges a surface of a photoconductor;

an exposure device that forms a latent image on the charged surface of the photoconductor;

a developing device that forms a toner image by applying toner to the latent image formed on the surface of the photoconductor;

a transfer device that transfers the toner image on an image forming medium;

a fixing device that fixes the transferred toner image on the image forming medium using heat and pressure; and an energy storage device according to an embodiment of the present invention.

By using an energy storage device according to an embodiment of the present invention that is reduced in size, the image forming apparatus using such an energy storage device may also be reduced in size, for example.

A discharge control method according to an embodiment of the present invention for controlling discharge operations of an energy storage device according to an embodiment of the present invention includes the steps of:

turning on/off a first discharge circuit arranged between a load and the first capacitor module or a second discharge circuit arranged between the load and the second capacitor module based on information indicating an operation status of the apparatus in which the energy device is used and controlling discharge operations of the first capacitor module or the second capacitor module.

By controlling discharge operations of the energy storage device based on information indicating the operation status of the apparatus using the energy storage device as in the above embodiment, over-discharge and reverse voltage may be prevented from occurring in the capacitor cells of the energy storage device, for example.

Further, it is noted that the present invention is not limited to the specifically disclosed embodiments, and variations and modifications may be made without departing from the scope of the present invention.

The present application is based on and claims the benefit of the earlier filing date of Japanese Patent Application No. 2007-154300 filed on Jun. 11, 2007, the entire contents of which are hereby incorporated by reference.

What is claimed is:

1. An energy storage device that is used in an apparatus, the energy storage device comprising:

a plurality of capacitor cells of a first type having a first internal resistance;

a plurality of capacitor cells of a second type having a second internal resistance which is higher than the first internal resistance;

a detection unit that detects a voltage value between two opposing ends of at least one of the capacitor cells of the first type or at least one of the capacitor cells of the second type; and a control unit that controls discharge operations of said at least one of the capacitor cells of the first type or said at least one of the capacitor cells of the second type when the voltage value detected by the detection unit is greater than a predetermined threshold value, wherein:

the capacitor cells of the first type are serially connected to form a first capacitor module, the capacitor cells of the second type are serially connected to form a second capacitor module, and the first capacitor module and the second capacitor module are connected in parallel.

2. The energy storage device as claimed in claim 1, wherein a number of the capacitor cells of the first type included in the first capacitor module is different from a number of the capacitor cells of the second type included in the second capacitor module.

3. The energy storage device as claimed in claim 1, further comprising:

a switch for turning on/off a first discharge circuit that is arranged between a load and the first capacitor module or a second discharge circuit that is arranged between the load and the second capacitor module.

4. The energy storage device as claimed in claim 1, wherein the detection unit is configured to detect a voltage value between two opposing ends of the first capacitor module or the second capacitor module.

5. An energy storage device that is used in an apparatus, the energy storage device comprising:

a plurality of capacitor cells of a first type having a first internal resistance;

a plurality of capacitor cells of a second type having a second internal resistance which is higher than the first internal resistance; and a voltage detection switching unit that integrates a switch arranged between two opposing ends of at least one of the capacitor cells of the first type or at least one of the capacitor cells of the second type, and a detection unit that detects a voltage value between the two opposing ends of said at least one of the capacitor cells of the first type or said at least one of the capacitor cells of the second type, wherein:

the voltage detection switching unit is configured to turn on/off the switch according to the voltage value detected by the detection unit and control charge operations of said at least one of the capacitor cells of the first type or said at least one of the capacitor cells of the second type, the capacitor cells of the first type are serially connected to form a first capacitor module, the capacitor cells of the second type are serially connected to form a second capacitor module, and the first capacitor module and the second capacitor module are connected in parallel.

6. The energy storage device as claimed in claim 5, wherein the switch is arranged between two opposing ends of the first capacitor module or the second capacitor module;

the detection unit is configured to detect a voltage value between the two opposing ends of the first capacitor module or the second capacitor module; and the voltage detection switching unit is configured to control charge operations of the first capacitor module or the second capacitor module.

7. The energy storage device as claimed in claim 5, wherein a number of the capacitor cells of the first type included in the first capacitor module is different from a number of the capacitor cells of the second type included in the second capacitor module.

8. The energy storage device as claimed in claim 5, further comprising:

a switch for turning on/off a first discharge circuit that is arranged between a load and the first capacitor module or a second discharge circuit that is arranged between the load and the second capacitor module; and a control unit that transmits a control signal to the switch and controls discharge operations of the first capacitor module or the second capacitor module based on information indicating an operation status of the apparatus.

9. The energy storage device as claimed in claim 8, wherein the switch is arranged between two opposing ends of the first capacitor module or the second capacitor module;

the detection unit is configured to detect a voltage value between the two opposing ends of the first capacitor module or the second capacitor module; and the voltage detection switching unit is configured to control charge operations of the first capacitor module or the second capacitor module.

* * * * *